US012682774B1

(12) United States Patent
Hilton et al.

(10) Patent No.: US 12,682,774 B1
(45) Date of Patent: Jul. 14, 2026

(54) REMOTE VISUAL MONITORING SYSTEM FOR AUTONOMOUS FLIGHT OPERATIONAL AREAS

(71) Applicant: WING AVIATION LLC, Mountain View, CA (US)

(72) Inventors: Jason Hilton, Standford, CA (US); Jeremy Chalmer, Redwood City, CA (US); Tray Mayfield, Lees Summit, MO (US); Zul Irshad, Sydney (AU)

(73) Assignee: Wing Aviation LLC, Palo Alto, CA (US)

( * ) Notice: Subject to any disclaimer, the term of this patent is extended or adjusted under 35 U.S.C. 154(b) by 267 days.

(21) Appl. No.: 18/651,164

(22) Filed: Apr. 30, 2024

(51) Int. Cl.
*G06V 20/17* (2022.01)
*G08G 5/26* (2025.01)
*G08G 5/80* (2025.01)

(52) U.S. Cl.
CPC .............. *G08G 5/80* (2025.01); *G06V 20/17* (2022.01); *G08G 5/26* (2025.01)

(58) Field of Classification Search
CPC ............. G08G 5/80; G08G 5/26; G06V 20/17
See application file for complete search history.

(56) References Cited

U.S. PATENT DOCUMENTS

| | | | | |
|---|---|---|---|---|
| 10,726,745 | B2 * | 7/2020 | Zavesky | ................. G06T 17/05 |
| 11,501,628 | B2 | 11/2022 | Jedwab | |
| 11,693,432 | B1 * | 7/2023 | Clark | ..................... G05D 1/104 |
| | | | | 701/120 |
| 2014/0249693 | A1 * | 9/2014 | Stark | ........................ G08G 5/32 |
| | | | | 701/2 |
| 2022/0211333 | A1 | 7/2022 | Jacquel et al. | |
| 2022/0259947 | A1 | 8/2022 | Li et al. | |

* cited by examiner

*Primary Examiner* — Siamak Harandi
(74) *Attorney, Agent, or Firm* — Christensen O'Connor Johnson Kindness PLLC

(57) ABSTRACT

A visual monitoring system for monitoring an autonomous flight operational area from a remote location is provided. The visual monitoring system can be configured to capture image data related to a verification target with one or more cameras, transmit the image data to a remote location, and display the image data related to the verification target for review by operational personnel at the remote location. The image data can be related to at least a first verification target having a first nominal condition. The operational personnel can review the image data and compare it to the data to the first nominal condition. If an off-nominal condition of the first verification target is detected by the operational personnel, the visual monitoring system can pause operations at the autonomous flight operational area until the off-nominal condition of the first verification target is resolved.

19 Claims, 3 Drawing Sheets

REMOTE VISUAL MONITORING SYSTEM FOR AUTONOMOUS FLIGHT OPERATIONAL AREAS

TECHNICAL FIELD

This disclosure relates generally to systems for visual monitoring of autonomous flight operational areas, and in particular but not exclusively, relates to providing visual verification of critical aspects of the operational areas to pilots in command of unmanned aerial vehicles and/or ground support operators of operational sites, such that safety and operational readiness can be assessed from a remote location.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments, the operational areas of the UAV fleet should be monitored for operational readiness. A UAV operational site can require visual inspection by operations personnel, such as the integrity of the boundaries of the site, the presence of the UAV, visibility criteria, etc.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
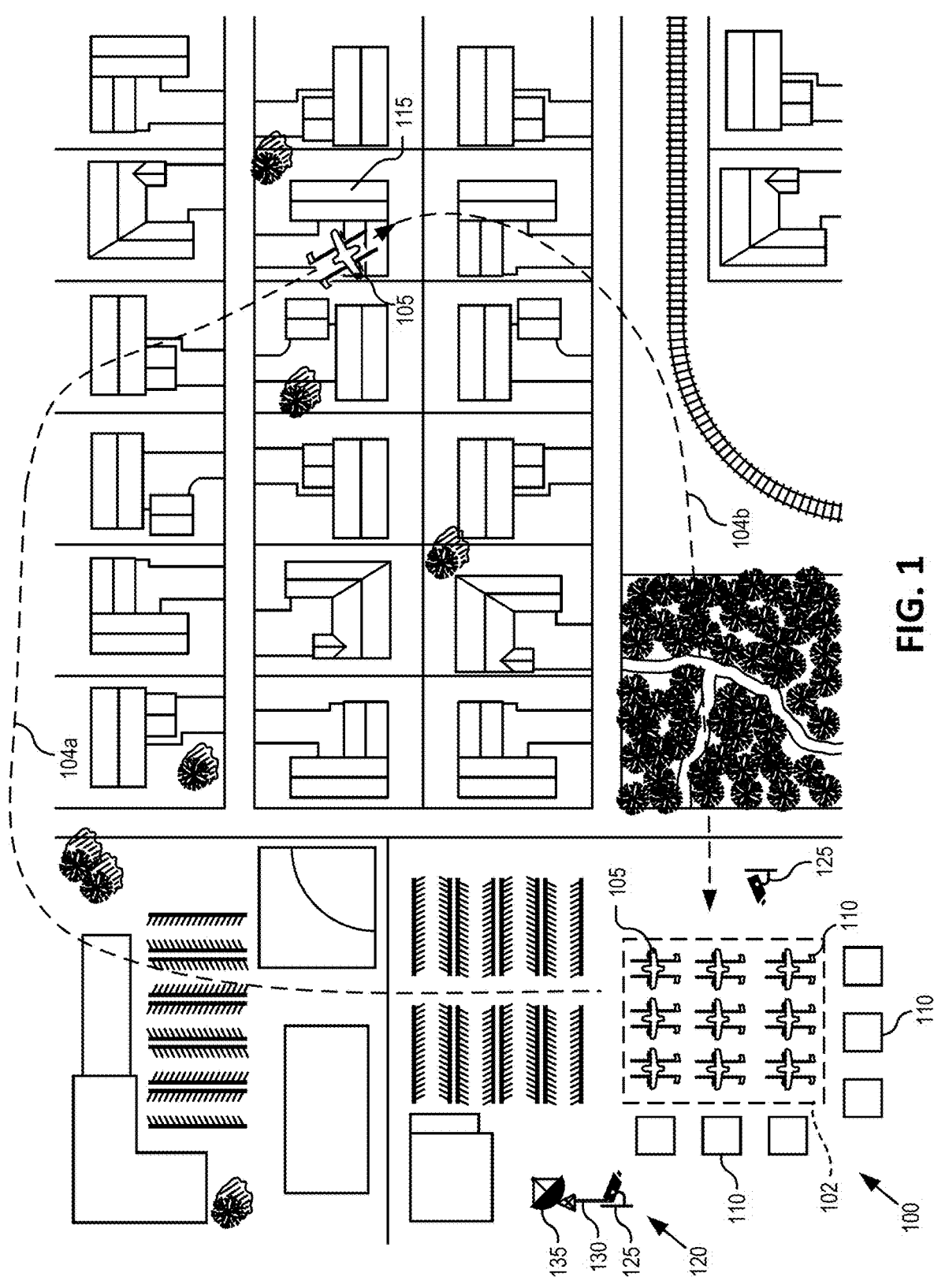
FIG. 1 illustrates a fleet of unmanned aerial vehicles (UAVs) staged at a terminal area having a remote visual monitoring system, in accordance with embodiments of the present disclosure.

Embodiments of a remote visual monitoring system (RVMS) for autonomous aircraft operational areas, such as an operational area of a UAV fleet, are described herein. The RVMS of the present disclosure utilizes one or more cameras to capture image data that can provide visual verification of critical aspects of the autonomous aircraft operational areas ("flight lines," "terminal areas," "nests," "payload loading," etc.) to pilots in command (PIC) and/or ground support operators (GSO) to assess safety and operational readiness of the operational area. Using the RVMS of the present disclosure, the PICs and/or GSOs can assess an operational area at a remote location such that operation can be scaled without increasing the number of personnel responsible for a given site or area. For example, a single PIC can be responsible for the operation of multiple autonomous vehicles while being stationed at a monitoring location that is remote to the sites, or a GSO can be responsible for multiple autonomous vehicle operational sites without being present during routine operations. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide a technique for operational personnel (e.g., a PIC/GSO or other operational personnel) to assess operational readiness and safety of a UAV flight operational area without being physically co-located to view the UAV fleet at the terminal area, verify UAV flight lines on-site, and/or check other critical aspects of the operation site (e.g., "visibility targets," such as the boundary fences, the physical position of the UAVs, package locations, etc.). This remote monitoring can reduce the need for physical operational personnel presence at each UAV fleet operational area, which can increase the scalability of UAV fleet operations while ensuring safe operation, boundary integrity, and/or maintaining compliance with regulations for flight line clearance (e.g., with the Federal Aviation Administration or other aviation regulating authority). By using the RVMS disclosed herein, remotely located personnel can assess operational readiness for continued safe operation of the UAV fleet to and from the terminal/nest within the operational area.

Embodiments of the RVMS disclosed herein can include various components, such as cameras, connectors, power supplies, data capture devices, storage, etc. that support the functionality of the RVMS. These components can be generally connected to a network that allows the RVMS to provide images and/or video of UAV fleet operational areas to be viewed by software used by the PIC/GSO or other operational personnel (e.g., such as a web browser-based application interface). In some embodiments, the RVMS can be connected wirelessly through cellular or satellite networks, and can have enhanced or assured connectivity for critical operations. In some implementations, the wireless connection can be supplemented by a wired network connection, such as in areas with poor or intermittent wireless network quality. The software application that processes the remote visual monitoring data (imagery and metadata) of the RVMS can include an interface application for operational personnel (e.g., PIC/GSO) to view and assess the operational readiness of the UAV operational area.

FIG. 1 is a plan view illustration of a terminal area 100 for staging UAVs 105 that deliver packages to a neighborhood, in accordance with an embodiment of the disclosure. The UAVs 105 may one day routinely deliver small items into urban or suburban neighborhoods from small regional or neighborhood hubs such as the terminal area 100. The vendor facilities 110 may be located adjacent to the terminal area 100 to take advantage of the aerial delivery service, e.g., a terminal area can be located on a portion of the property of a vendor facility utilizing the UAV fleet. A typical aerial delivery mission may include loading a UAV 105 with a package from a vendor facility 110 at the terminal area 100, where the UAV 105 ascends to a cruise altitude to follow an approach route 104a to a customer destination 115. At the customer destination 115, the UAV 105 descends for package drop-off before once again ascending to a cruise altitude for the return journey along a return route 104b back to the terminal area 100.

During the course of operating the UAV 105, the readiness of the terminal area 100, the UAVs 105, and other operational parameters at the site may be assessed by operations personnel (e.g., a PIC/GSO) by use of a remote visual monitoring system 120 (RVMS 120). Detection of off-nominal situations through the RVMS 120 is important for ensuring safe UAV flight and operation of the terminal area 100. Examples of an off-nominal situation of a visibility target can include breach of a fence line 102 of the terminal area 100, unexpected position of the UAV 105, charging dock movement, payload damage, etc. In some embodiments, the RVMS 120 includes one or more cameras 125 that are positioned to capture image data (still images and/or video) of visibility targets of the terminal area 100, e.g., the nest of UAVs 105, the fence line 102 of the terminal area 100, the vendor facilities 110, etc. During operation of the RVMS 120, the cameras 125 can periodically capture an image and/or video of the terminal area 100 for remote viewing by authorized operations personnel through software of the RVMS 120. Due to the sensitive nature of the image data, the RVMS 120 can include authentication based on suitable encryption standards to ensure viewing access is available only to authorized users.

As described above, the cameras 125 can be positioned at various locations around the terminal area 100 where visual monitoring is desired. In one embodiment, the cameras 125 may be positioned to capture image data of the boundaries of the terminal area 100 (such as the fence line 102 or gate (not shown)), the position and orientation of one or more of the UAVs 105, the UAV pads, the packages and package loading, the flight line to ensure no obstructions exist, visibility criteria (a known distance a camera can view can determine whether UAV operation is safe from a visibility standpoint), among other data. With any of the camera positions, a privacy zone can be implemented to remove or mask an area within the camera field of view from recording, e.g., the public area of a parking lot when a UAV operational area is located at a retail store, etc. The cameras 125 can be powered by any suitable supply, such as wired power input, battery power with solar, etc.

The cameras 125 of the RVMS 120 can include onboard wireless communications, such as cellular radios, as will be described in detail with respect to FIG. 3, and/or can be connected by a communication wire 130 (e.g., a network cable or other communication cable) to a separate communication hub 135. The RVMS 120 can activate the cameras 125 to record the remote visual monitoring data (imagery and metadata) and transmit the data for review by the remote operations personnel and/or store the data in one or more data stores for future review. For example, this archival footage may be used for forensic purposes, such as when an incident is documented and a status of the areas of the terminal area 100 covered by the cameras 125 at the time of the incident requires review. These images can include text overlay for image data, such as timestamps, site identification information, camera status, etc. In one embodiment, the cameras 125 can be programmed to refresh the image at regular intervals (10 seconds, 30 seconds, 60 seconds, etc.) and to store the data for a predetermined duration (1 day, 1 week, 30 days, 6 months, etc.). The various components of the RVMS 120 can be specified for durability (water resistance, sun exposure, shock absorption, etc.), desired lifecycle (shutter count, sensor cycles, storage capacity, etc.), and performance (image quality, zoom capability, low-light infrared sensitivity, etc.), among other specifications.

Any of the components of the RVMS 120 (e.g., the cameras 125, the communication hub 135, etc.) can include one or more device health monitoring systems to identify and report any detected device health issues that would cause the component to be unreliable or unavailable for assessing operational area image data. In some embodiments, the device health monitoring systems can determine whether a camera is connected to the network, the image data is from a relevant timestamp (e.g., near-real-time for current operational assessments), the image data is of sufficient quality, the battery is at an adequate level, the image meets the minimum quality requirements, the low-light system has acceptable performance, etc. If the image capture fails due to an error in a component of the RVMS 120, the system can include programming to automatically retry to capture the image data at the next interval. The control system of the RVMS 120 can include a system-wide health status to assess the current operational performance of all components of the RVMS 120.

Figure 2:
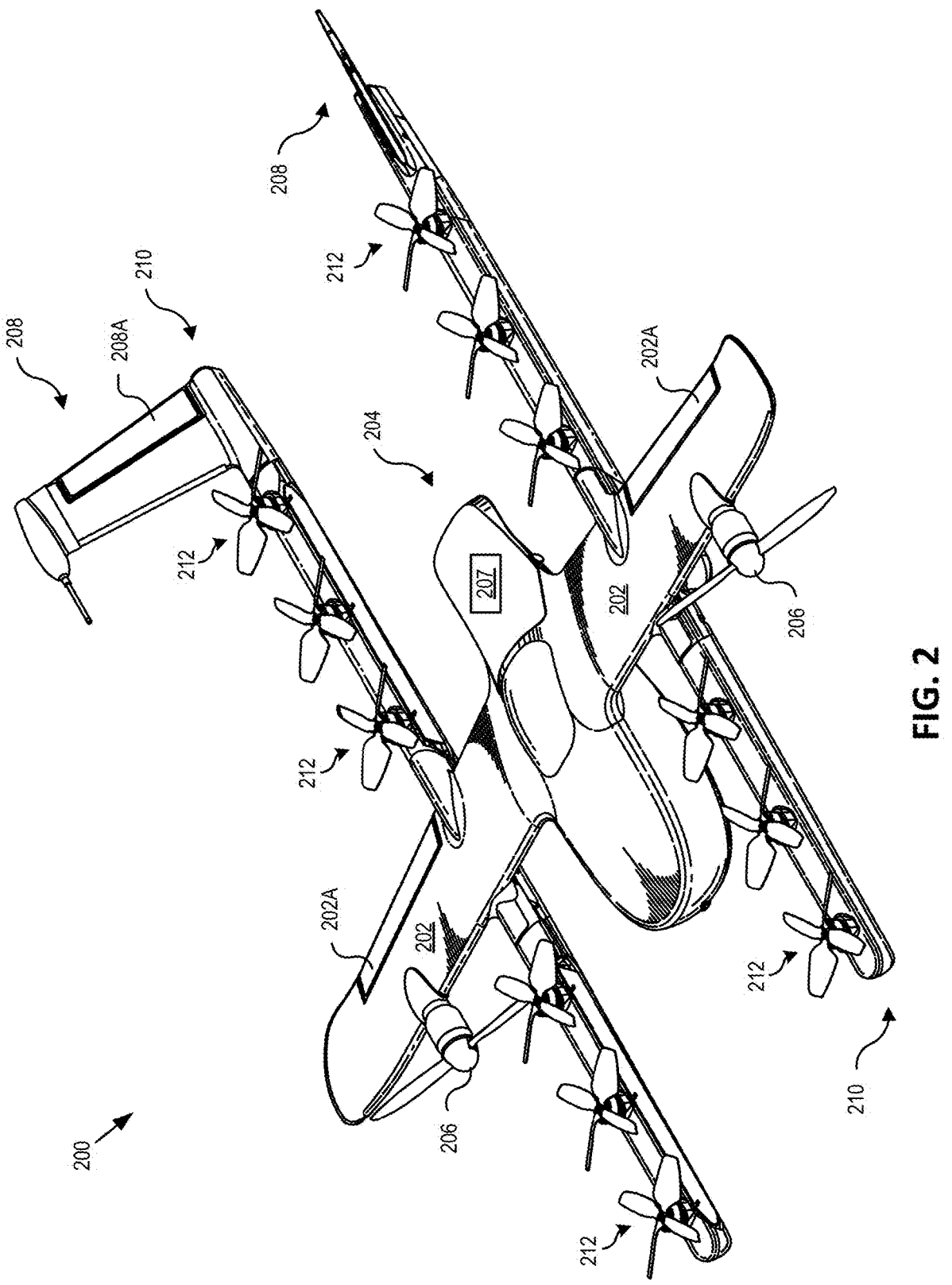
FIG. 2 is a topside perspective view of a UAV, in accordance with embodiments of the present disclosure.

FIG. 2 illustrates an aerial vehicle or UAV 200 that is well suited for delivery of packages, in accordance with an embodiment of the present disclosure. FIG. 2 is a topside perspective view illustration of the UAV 200. The UAV 200 is one possible implementation of the UAVs 105 illustrated in FIG. 1, although other types of UAVs may be implemented as well. The UAV 200 can be of the type suitable for use with the RVMS 120 described above.

The illustrated embodiment of the UAV 200 is a vertical takeoff and landing (VTOL) UAV that includes separate propulsion units 206 and 212 for providing horizontal and vertical propulsion, respectively. The UAV 200 is a fixed-wing aerial vehicle, which as the name implies, has a wing assembly 202 that can generate lift based on the wing shape and the vehicle's forward airspeed when propelled horizontally by the propulsion units 206. The illustrated embodiment of the UAV 200 has an airframe that includes a fuselage 204 and the wing assembly 202. In one embodiment, the fuselage 204 is modular and includes a battery module, an avionics module, and a mission payload module.

These modules are detachable from each other and mechanically securable to each other to contiguously form at least a portion of the fuselage 204 or UAV main body.

The battery module (e.g., fore portion of the fuselage 204) includes a cavity for housing one or more batteries for powering the UAV 200. The avionics module (e.g., aft portion of the fuselage 204) houses flight control circuitry of the UAV 200, which can include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). Collectively, these functional electronic subsystems for controlling the UAV 200, communicating, and sensing the environment may be referred to as a control system 207. The mission payload module (e.g., middle portion of the fuselage 204) houses equipment associated with a mission of the UAV 200. For example, the mission payload module can include a payload actuator (not shown) for holding and releasing an externally attached payload.

The UAV 200 can include one or more identifiers (not shown) that are capable of being captured by the cameras 125 of the RVMS 120. In some embodiments, one or more exterior surfaces of the UAV 200 can include alphanumeric identifiers, QR identifiers, barcode identifiers, and/or other suitable identifiers to provide the RVMS 120 a visual identification feature for identity confirmation of any given UAV. In this regard, when using the RVMS, the operational personnel can verify the identity of a UAV captured by the cameras, such as to confirm accuracy of the positional data (e.g., GPS) of the UAV within the operational area. In addition to identification information, the UAV 200 can include directional information, e.g., to visually confirm the direction the propulsion unit 206 is pointing, attitude information, e.g., to ensure that the UAV is level while docked, among other suitable information that can be captured by the RVMS 120.

Figure 3:
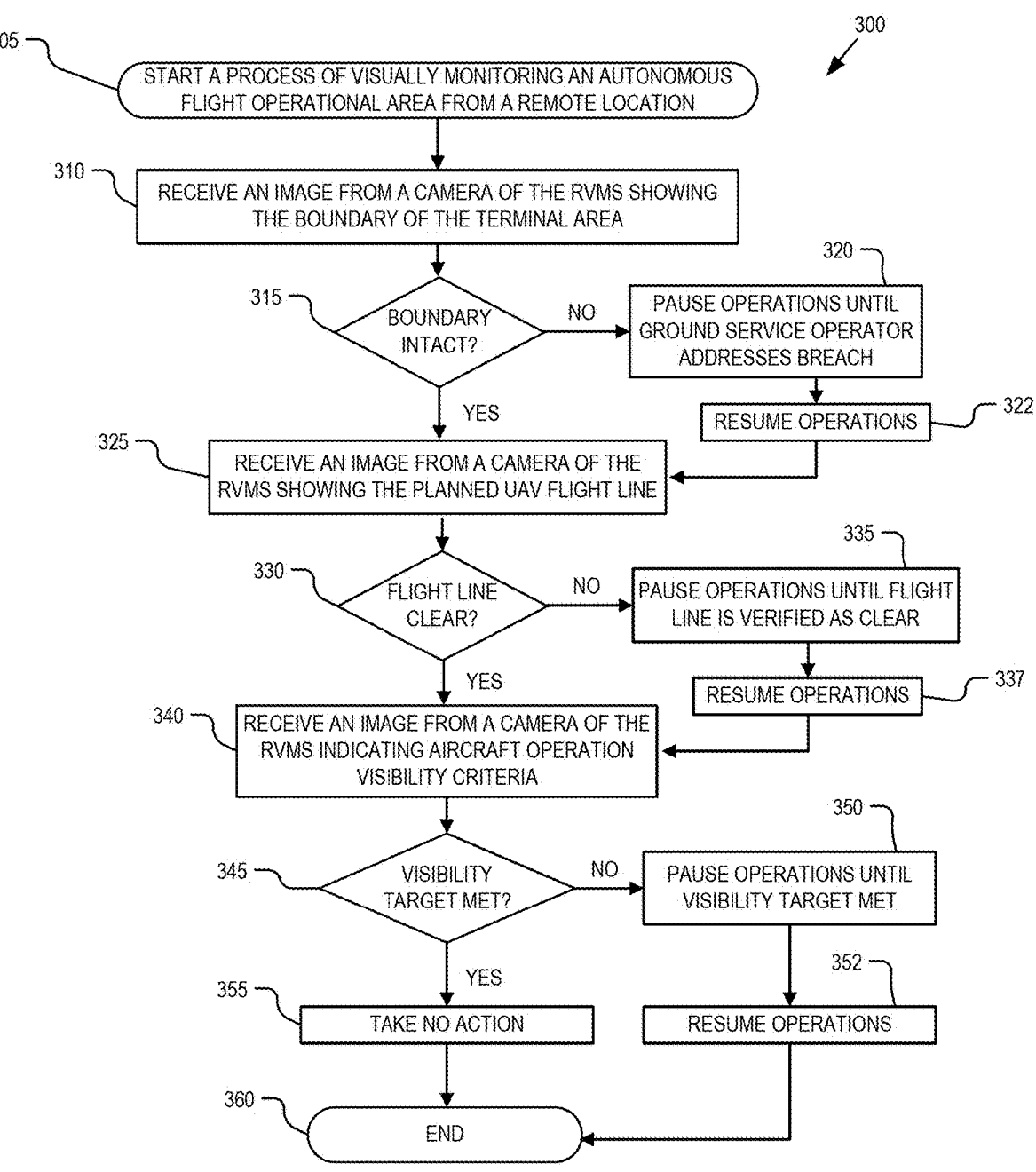
FIG. 3 is a flow chart of a process for visual monitoring of an autonomous flight operational area from a remote location, in accordance with embodiments of the present disclosure.

FIG. 3 is a flow chart of a process 300 for visual monitoring of an autonomous flight operational area to provide visual verification of critical aspects to the operational personnel (PIC/GSO) so that safety and operational readiness can be assessed remotely. In the process 300, the RVMS provides an image and data to a monitoring system (e.g., a web browser-based application interface) so that operational personnel can assess whether an operational area is safe and ready for initial or continued operation. During the review, the operational personnel may view boundaries of the terminal area (such as the fence line 102 or gate), the position and orientation of one or more of the UAVs, the UAV pads and chargers, package loading, safety of flight line, and visibility criteria (a known distance a camera is capable of viewing can determine whether UAV operation is safe from a visibility standpoint), among other aspects of the operational area. The order in which some or all of the process blocks appear in the process 300 should not be deemed limiting. Rather, one of ordinary skill in the art having the benefit of the present disclosure will understand that some of the process blocks may be executed in a variety of orders not illustrated, or even in parallel. Although the following description may reference the UAV 105 of FIG. 1 or the UAV 200 of FIG. 2, the process 300 may be suitable for use with any UAV configuration and/or other aircraft.

From a start block 305, the process 300 proceeds to block 310, where the monitoring system receives an image from a camera (e.g., the camera 125 of the RVMS 120) showing boundary of the terminal area (e.g., the fence line 102 of the terminal area 100). Upon receipt of the image in block 310, at block 315 the operational personnel (PIC/GSO or other) visually reviews the image to determine whether the boundary of the terminal area is intact or whether there has been a breach (e.g., a person or object entering the terminal area, a broken fence portion, etc.). If the boundary is not intact, at block 320, operations of the UAV operational area are paused until a GSO can address the breach. Once the breach has been addressed by the GSO or the boundary is determined to be intact, operation is resumed at block 322. If the boundary is verified as intact, the process 300 proceeds to block 325.

At block 325, the monitoring system receives an image from a camera (e.g., the camera 125 of the RVMS 120) showing the planned UAV (e.g., the UAV 105 or UAV 200, or other suitable vehicle) flight line. Upon receipt of the image in block 325, at block 330 the operational personnel (PIC/GSO or other) visually reviews the image to determine whether the flight line is clear or obstructed (e.g., a person or object blocking the flight line, etc.). If the flight line is obstructed, at block 335, operations of the UAV operational area are paused until the flight line is verified as clear by a subsequent image from the camera, at which point operation is resumed at block 337. If the flight line remains obstructed, the GSO may be dispatched to the terminal area to clear the flight line for safe operation. If the flight line is verified as clear, the process 300 proceeds to block 340.

At block 340, the monitoring system receives an image from a camera (e.g., the camera 125 of the RVMS 120) indicating aircraft operation visibility criteria (a known distance a camera can view can determine whether UAV operation is safe from a visibility standpoint under FAA requirements). Upon receipt of the image in block 340, at block 345 the operational personnel (PIC/GSO or other) visually reviews the image to determine whether the flight line is clear or obstructed (e.g., a person or object blocking the flight line, etc.). If the visibility does not meet the minimum target, at block 350, operations of the UAV operational area are paused until the visibility target is met by a subsequent image from the camera at which point operation is resumed at block 352. If the visibility target is met in block 345, the operational personnel take no action in block 355 and permit the UAV operational area to continue normal operation, reaching the end block 360. In some embodiments, the process 300 can be repeated at predetermined intervals, on demand, or according to a schedule. For example, a PIC may be required to monitor the images of the RVMS 120 at regular intervals (30 seconds, 60 seconds, 3 minutes, etc.) at which time the process 300 is restarted.

In some embodiments of the RVMS 120, the communication interface 135 includes hardware and software to enable any suitable communication technology for communicating with a separate system (e.g., the monitoring platform) located remotely (e.g., a computing system located near the terminal area 100, at a central control center, generally in the cloud, etc.). The remote-located system can include processors, communication interfaces, data stores, computer-readable media, and software configured to communicate with the RVMS 120 to provide, e.g., nominal operational area images, image capture frequency, storage duration, and other suitable communications. In some embodiments, the communication interface 135 includes multiple communication interfaces, each for use in appropriate circumstances. For example, the communication interface 135 may include a long-range wireless interface such as a 4G or LTE interface, or any other type of long-range wireless interface (e.g., 2G, 3G, 5G, or WiMAX), to be used to communicate with the remote-located monitoring platform. The communication interface 135 may also include a medium-range wireless interface such as a Wi-Fi interface to be used when the monitoring platform or is at an area near the terminal area 100. The communication interface 135 may also include a short-range wireless interface such as a Bluetooth interface to be used to communicate with the cameras 125 in a localized area. In any of the embodiments herein, each of the cameras 125 can include an individual, dedicated communication interface 135, either onboard or remote (adjacent to the camera), to transmit the image data collected by the camera.

In some embodiments, separate system (e.g., the monitoring platform) located remotely (e.g., a computing system located near the terminal area 100, at a central control center, generally in the cloud, etc.) can include a processor that is suitably any type of computer processor capable of receiving signals from the cameras 125 and other components of the RVMS 120 and executing instructions stored on a computer-readable medium in communication with the communication interface 135. In some embodiments, the computer-readable medium may include one or more devices capable of storing information for access by the monitoring platform. In some embodiments, the computer-readable medium may include one or more of a hard drive, a flash drive, an EEPROM, and combinations thereof. The processor can include any suitable type of general-purpose computer processor. In some embodiments, the processor can include one or more special-purpose computer processors or AI accelerators optimized for specific computing tasks, including but not limited to graphical processing units (GPUs), vision processing units (VPTs), and tensor processing units (TPUs).

Returning to FIG. 2, the illustrated embodiment of the UAV 200 further includes the horizontal propulsion units 206 positioned on the wing assembly 202, which can each include a motor, shaft, motor mount, and propeller, for propelling the UAV 200 generally horizontally. The illustrated embodiment of the UAV 200 includes two boom assemblies 210 that secure to the wing assembly 202. Vertical propulsion units 212 can be mounted to the boom assemblies 210. The vertical propulsion units 212 providing vertical propulsion. The vertical propulsion units 212 may be used during a hover mode where the UAV 200 is descending (e.g., to a delivery location), ascending (e.g., at initial launch or following a delivery), or maintaining a constant altitude. Stabilizers 208 (or tails) may be included with the UAV 200 to control pitch and stabilize the aerial vehicle's yaw (left or right turns) during cruise. In some embodiments, during cruise mode, the vertical propulsion units 212 are disabled or powered low, and during hover mode, the horizontal propulsion units 206 are disabled or powered low.

During flight, the UAV 200 may control the direction and/or speed of its movement by controlling its pitch, roll, yaw, and/or altitude. Thrust from the propulsion units 206 is generally horizontal and used to control air speed. For example, the stabilizers 208 may include one or more rudders 208A for controlling the aerial vehicle's yaw, and the wing assembly 202 may include elevators for controlling the aerial vehicle's pitch and/or ailerons 202A for controlling the aerial vehicle's roll. As another example, increasing or decreasing the speed of all the propellers simultaneously can result in UAV 200 increasing or decreasing its altitude, respectively. The UAV 200 may also include components for sensing the environment around the UAV 200, including but not limited to an audio sensor 222 and an audio sensor 214.

Many variations on the illustrated fixed-wing aerial vehicle are possible. For instance, aerial vehicles with more wings (e.g., an "x-wing" configuration with four wings), are also possible. Although FIG. 2 illustrates one wing assembly 202, two boom assemblies 210, two horizontal propulsion units 206, and six vertical propulsion units 212 per boom assembly 210, it should be appreciated that other variants of the UAV 200 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of visual monitoring system at an autonomous flight operational area, causes the visual monitoring system to perform actions comprising:
　capture image data with a first camera related to a first verification target, the first verification target having a first nominal condition;

transmit the image data related to the first verification target to a remote location;

display the image data related to the first verification target for review by operational personnel at the remote location, wherein, when compared to the first nominal condition if an off-nominal condition of the first verification target is detected by the operational personnel, the visual monitoring system pauses operations at the autonomous flight operational area until the off-nominal condition of the first verification target is resolved;

capture image data with a second camera related to a second verification target, the second verification target having a second nominal condition;

transmit the image data related to the second verification target to the remote location;

display the image data related to the second verification target for review by the operational personnel at the remote location, wherein, when compared to the second nominal condition if an off-nominal condition of the second verification target is detected by the operational personnel, the visual monitoring system pauses operations at the autonomous flight operational area until the off-nominal condition of the second verification target is resolved.

2. The non-transitory computer-readable medium of claim 1, wherein the first verification target is a boundary of the autonomous flight operational area, and wherein the first nominal condition is continuity of the boundary.

3. The non-transitory computer-readable medium of claim 2, wherein the second verification target is a flight line of an unmanned aerial vehicle of the autonomous flight operational area, and wherein the first nominal condition is an obstruction-free flight line.

4. The non-transitory computer-readable medium of claim 1, further comprising causing the visual monitoring system to perform actions comprising:

capturing image data with a third camera related to a third verification target, the third verification target having a third nominal condition;

transmitting the image data related to the third verification target to the remote location;

displaying the image data related to the third verification target for review by operational personnel at the remote location, wherein, when compared to the third nominal condition if an off-nominal condition of the third verification target is detected by the operational personnel, the visual monitoring system pauses operations at the autonomous flight operational area until the off-nominal condition of the third verification target is resolved.

5. The non-transitory computer-readable medium of claim 4, wherein the first verification target is a boundary of the autonomous flight operational area, and wherein the first nominal condition is continuity of the boundary.

6. The non-transitory computer-readable medium of claim 5, wherein the second verification target is a flight line of an unmanned aerial vehicle of the autonomous flight operational area, and wherein the first nominal condition is an obstruction-free flight line.

7. The non-transitory computer-readable medium of claim 6, wherein the third verification target is an aircraft operation visibility criteria of an unmanned aerial vehicle of the autonomous flight operational area, and wherein the third nominal condition is a minimum visibility target.

8. The non-transitory computer-readable medium of claim 1, further comprising causing the visual monitoring system to perform actions comprising:

identifying and reporting a device health issue detected by a device health monitoring system of the visual monitoring system, wherein the device health issue is a condition that would cause the visual monitoring system to be unreliable or unavailable for assessing image data.

9. The non-transitory computer-readable medium of claim 1, further comprising at least one identifier operably coupled to a surface of an unmanned aerial vehicle in the autonomous flight operational area, wherein the identifier is configured to be captured by the visual monitoring system.

10. The non-transitory computer-readable medium of claim 9, wherein the at least one identifier comprises alphanumeric identifiers, QR identifiers, or barcode identifiers.

11. The non-transitory computer-readable medium of claim 9, wherein the at least one identifier comprises information related to an identity of the unmanned aerial vehicle, information related to a direction of a propulsion unit of the unmanned aerial vehicle, and/or information related to an attitude of the unmanned aerial vehicle.

12. A method for visually monitoring an autonomous flight operational area from a remote location with a visual monitoring system, the method comprising:

receiving first image data from a first camera of the visual monitoring system showing a first verification target having a first nominal condition;

reviewing, by operational personnel located at the remote location, the first image data related to the first verification target, and comparing the first image data to the first nominal condition, wherein, if the first image data shows an off-nominal condition, the visual monitoring system pauses operations at the autonomous flight operational area until the off-nominal condition of the first verification target is resolved;

receiving second image data from a second camera of the visual monitoring system showing a second verification target having a second nominal condition;

reviewing, by operational personnel located at the remote location, the second image data related to the second verification target, and comparing the second image data to the second nominal condition, wherein, if the second image data shows an off-nominal condition, the visual monitoring system pauses operations at the autonomous flight operational area until the off-nominal condition of the second verification target is resolved.

13. The method of claim 12, wherein the first verification target is a boundary of the autonomous flight operational area, and wherein the first nominal condition is continuity of the boundary.

14. The method of claim 13, wherein the second verification target is a flight line of an unmanned aerial vehicle of the autonomous flight operational area, and wherein the first nominal condition is an obstruction-free flight line.

15. The method of claim 12, further comprising:

receiving third image data from a third camera of the visual monitoring system showing a third verification target having a third nominal condition;

reviewing, by operational personnel located at the remote location, the third image data related to the third verification target, and comparing the third image data to the third nominal condition, wherein, if the third image data shows an off-nominal condition, the visual monitoring system pauses operations at the autonomous flight operational area until the off-nominal condition of the third verification target is resolved.

16. The method of claim 15, wherein the first verification target is a boundary of the autonomous flight operational area, and wherein the first nominal condition is continuity of the boundary.

17. The method of claim 16, wherein the second verification target is a flight line of an unmanned aerial vehicle of the autonomous flight operational area, and wherein the first nominal condition is an obstruction-free flight line.

18. The method of claim 17, wherein the third verification target is an aircraft operation visibility criteria of an unmanned aerial vehicle of the autonomous flight operational area, and wherein the third nominal condition is a minimum visibility target.

19. The method of claim 12, further comprising:
   identifying and reporting a device health issue detected by a device health monitoring system of the visual monitoring system, wherein the device health issue is a condition that would cause the visual monitoring system to be unreliable or unavailable for assessing image data.

* * * * *